Figure 1:
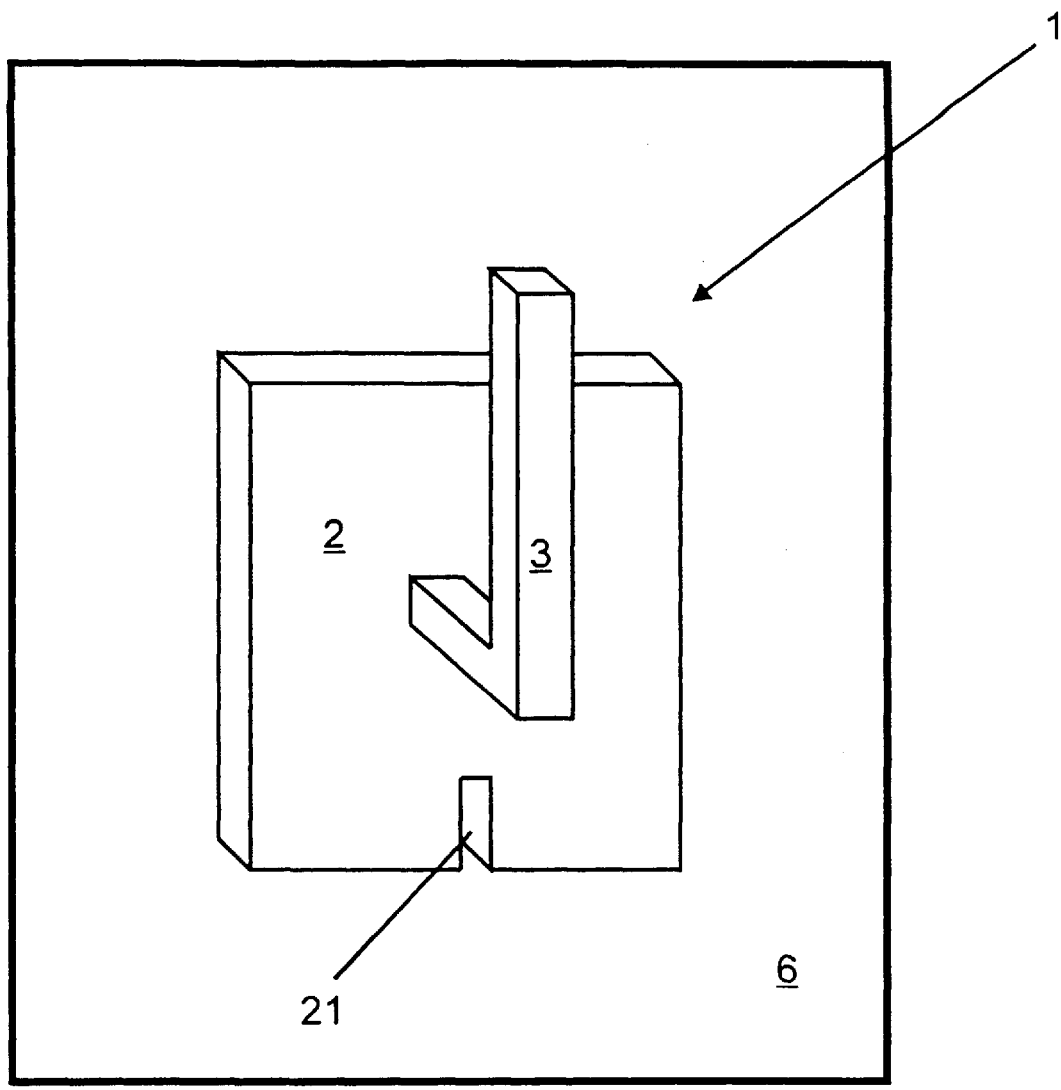

United States Patent
Schumann

Patent Number: 5,921,514
Date of Patent: Jul. 13, 1999

[54] REDETACHABLE, SELF-ADHESIVE HOOK

[75] Inventor: Jörn Schumann, Reinbek, Germany

[73] Assignee: Beirersdorf AG, Hamburg, Germany

[21] Appl. No.: 08/936,282

[22] Filed: Sep. 24, 1997

[30] Foreign Application Priority Data

Oct. 5, 1996 [DE] Germany .................. 196 41 118

[51] Int. Cl.⁶ ............................................. A47G 1/17
[52] U.S. Cl. .............................. 248/205.3; 248/304
[58] Field of Search ......................... 248/205.3, 304, 248/205.4; 428/40, 343

[56] References Cited

U.S. PATENT DOCUMENTS

| | | | |
|---|---|---|---|
| 4,106,741 | 8/1978 | Hogg | 248/467 |
| 4,317,555 | 3/1982 | Hogg | 248/467 |
| 4,948,366 | 8/1990 | Horn et al. | 433/9 |
| 5,269,485 | 12/1993 | Dwinell et al. | 248/216.4 |
| 5,462,782 | 10/1995 | Su | 248/205.3 |
| 5,507,464 | 4/1996 | Hamerski et al. | 248/205.3 |
| 5,738,325 | 4/1998 | Brown | 248/205.3 |

*Primary Examiner*—Ramon O. Ramirez
*Assistant Examiner*—Robert Lipcsik
*Attorney, Agent, or Firm*—Sprung Kramer Schaefer & Briscoe

[57] ABSTRACT

Redetachable, self-adhesive hook or similar fixing device having a baseplate, characterized by a strip of a double-sided adhesive film which is such that the bond obtained with it can be separated again by pulling on it so as to stretch it, which film carries on its front face the baseplate and with its rear face is bonded to a substrate, the separation of the bonded baseplate of the fixing device together with the strip from the substrate taking place by rotation of the baseplate essentially in the plane of the bond.

11 Claims, 2 Drawing Sheets

REDETACHABLE, SELF-ADHESIVE HOOK

DESCRIPTION

The invention relates to a self-adhesive, redetachable hook or a similar fixing device which can be detached again from the substrate without any residue or damage.

For a relatively long time commercial hooks have been known which are fixed to the substrate by means of double-sided adhesive foam strips. Subsequent detachment is very difficult to achieve, and usually entails the destruction of the hook. Furthermore, residues of the adhesive strip remain on the substrate.

Self-adhesive hooks or comparable devices are known, inter alia, from German Patent DE 42 33 872. This patent describes a hook which is bonded to the substrate by means of a strip of an adhesive film, the adhesive film strip having a nonadhesive grip tab. To detach the hook from the substrate again, the adhesive film strip is drawn in the plane of the bond by pulling on the grip tab, and thereupon becomes unstuck. In order that the hook can be redetached from the substrate, it is absolutely necessary for the adhesive film strip to be bonded under the hook in such a way that the grip tab is visible.

This permanently visible grip tab of course mars the visual appearance of the stuck-on hook, but also has technical disadvantages. This is because the grip tab is supplied without protection against external influences. Heightened UV radiation or solvents impair the stability of the grip tab, which then readily tears on detachment under the effect of pulling. Subsequently, separation of the hook from the substrate is again possible only with destruction of the substrate or of the hook.

Hooks of this kind are already available commercially, under the name "TESA POWER-STRIPS MIT HAKEN"® [mit Haken="with hook"].

A comparable hook is disclosed in the PCT application WO 94/21157. The hook shown in this application uses an adhesive film which is highly elastic and, moreover, is not resilient.

Also available commercially are the "TESA POWER-STRIPS SYSTEMHAKEN"®[system hooks]. In order to attach such a hook to the substrate, a baseplate is first of all stuck by means of a strip of the abovementioned adhesive film, it being necessary again for the grip tab to remain visible.

The respective hook is then placed onto the baseplate. This hook, however, features a relatively complex method of bonding and, furthermore, it is complex to prepare as a result not least of the two-part configuration and is therefore expensive.

A feature common to all of the abovementioned systems, however, is that they also have practical disadvantages which may restrict their use. For instance, the procedure of proper bonding requires an explanation for the user. The reason for this is that, if the user fails to stick the hook in such a way that the grip tab of the adhesive film is visible, subsequent separation of the hook from the substrate is no longer possible. Indeed, the detachment of the hook or of the said baseplate takes place by pulling on the grip tab parallel to the plane of the bond. The resulting extension of the adhesive film results in a reduction in the bond strength, and the adhesive film becomes detached without residue from the substrate and from the hook as well. If the adhesive film is employed incorrectly, the desired separation can only be achieved using appropriate force. However, this leads in every case to the destruction of the hook; furthermore, the substrate may also be damaged as well.

Finally, as result of the particular method of bonding, conventional hooks cannot be used in many places because there is no possibility of pulling the grip tab in the direction of the plane of the bond. Utility is restricted further still by the fact that in some places it is not possible to have the grip tab freely accessible at all, for example on edges or projections.

The object of the invention, therefore; was to provide a self-adhesive, redetachable hook or similar fastening device which does not have the abovementioned disadvantages.

This object is achieved by means of a self-adhesive, redetachable hook or similar fixing device as is described in Patent Claim 1. Further embodiments are the subject of the subclaims.

The invention relates accordingly to a redetachable, self-adhesive hook or similar fixing device with a baseplate and with a strip of a double-sided adhesive film. A feature of the adhesive film is that the bond obtained with it can be separated again by pulling on it so as to stretch it.

The front face of the adhesive film carries the baseplate of the fixing device, preferably in such a way that the front face of the strip is covered completely by the baseplate; the rear face of the adhesive film is covered with a release laminate, for example a release film or siliconized release paper. Following the removal of the release laminate, the rear face of the strip is bonded to a substrate.

The bonded baseplate together with the strip is separated from the substrate by rotating the fixing device essentially in the plane of the bond.

The baseplate can have a thickness of less 5 mm. In addition, the baseplate can be provided with at least one groove and/or at least one bore.

These techniques of implementing the baseplates mean that the necessary torque for separating the baseplate and thus the fixing device is possible only by means of an appropriately shaped key. This key embraces the baseplate similarly to the way a known socket spanner embraces a hexagonal nut. Alternatively, the key is shaped such that it engages by means of pins into the grooves or bores in the baseplate.

In order to utilize the baseplate to the optimum the strip can be shaped substantially like the baseplate. This produces a high holding force on a relatively small area.

The adhesive film is preferably elastically or plastically extendable with or without an intermediate backing, and is also preferably based on thermoplastic rubber and tackifying resins, being of high elasticity and low plasticity.

The adhesion of the adhesive film is advantageously less than the cohesion, the adhesion largely disappears when the film is extended, and the ratio of peel force to tear load is at least 1:1.5.

The fixing device consists preferably of plastic or metal, and so polyethylene terephthalate, polystyrene and ABS are particularly suitable.

A hook according to the invention and a fixing device according to the invention are outstandingly suitable for avoiding the disadvantages of the systems known to date. Because of the rotation of the hook for separation from the substrate it is no longer necessary to bond the adhesive film in such a way that a grip tab remains visible. Furthermore, the adhesive tape no longer requires any grip tab at all.

Consequently, tearing of the grip tab in the course of pulling is ruled out.

In addition, the user is readily able to stick on a hook according to the invention in the proper manner even in difficult circumstances of use, since the user also knows this method of bonding from the very simple hooks which have been known for a long time.

A hook according to the invention can, furthermore, be bonded—owing to the particular technique of detachment—even at places which were previously inaccessible to the conventional hooks because for lack of space the required pulling on the grip tab is not possible.

To detach the bonded hook, the hook itself, which is accordingly of stable construction, is rotated. Alternatively, it is also possible to take the baseplate of the hook and move it by a sufficiently large angle. For this purpose the baseplate advantageously has a thickness of at least 5 mm.

Depending on the size and type of the adhesive film strip, of the baseplate and of the substrate on which the hook is bonded, different hook loading limits can be achieved. The substrate must be level, firm and dry; further thorough cleaning is also advisable directly before bonding in order to ensure the permanent and reliable bonding of the hook.

In one particular embodiment of the baseplate of the hook it is possible to avoid a further, hitherto unsolved problem. A feature of the conventional systems is that the hook can be removed without residue at any time, but thus also by anyone. Especially when such hooks are stuck in areas with a changing public, for example in hotel rooms, restaurants or supermarkets, there is the risk of the hook, which indeed is reusable, being removed without authorization. If the baseplate is very thin or covers only a small area in total, the respective user can no longer detach the baseplate and thus the fixing device as a whole with the hand but only using a tool. The use of a key as described as the tool is a possibility.

If the baseplate is circular it can be provided with a groove which is engaged by the specific key having an appropriately shaped pin. It is also possible to provide at least one recess, for example a bore, in the baseplate, into which the key with the appropriate number of pins engages.

However, the invention is not restricted to these possibilities; rather, other possible embodiments of a key are also within the scope of the invention.

Following the separation of the hook together with the adhesive film from the substrate, the adhesive film itself is separated from the hook by simply pulling the adhesive film in the direction of the plane of the bond from the hook.

The hook is thus always reusable.

The intention of the text below is to illustrate the invention in more detail with reference to an example, without intending to be limiting in any form.

EXAMPLE 1

Figure 2:
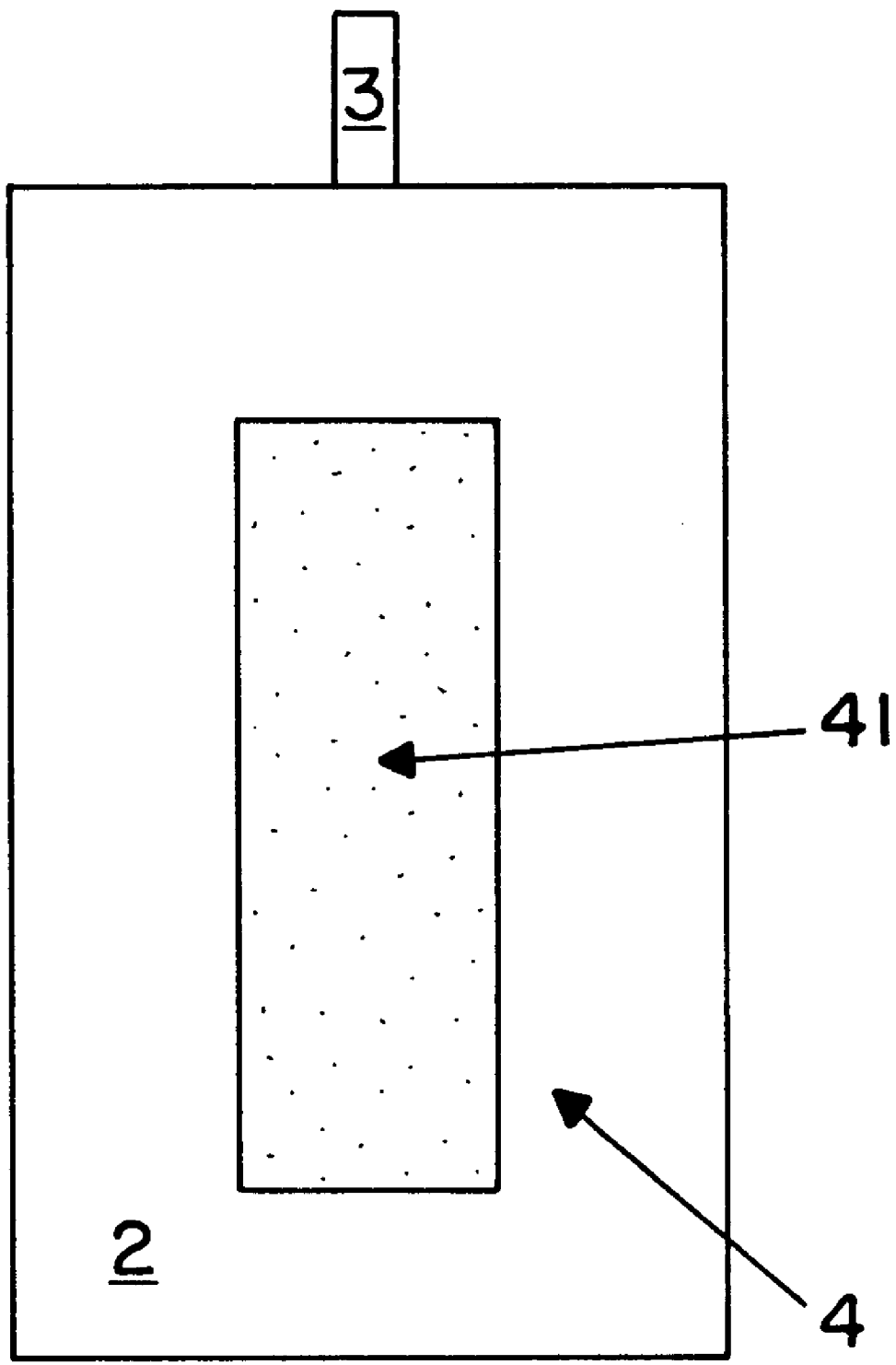

FIG 1. shows a hook 1 according to the invention, bonded to a tile 6, and FIG. 2 shows the rear face of the baseplate 2 of the hook 1, on which hook 1 there is bonded a strip 4 of the adhesive film, which strip 4 is also covered with a release film 41.

Onto this hook 1, with its rectangular baseplate 2 measuring 20 mm×20 mm and carrying a pin-like extension 3 on its front face, there is first of all bonded a strip 4 having adhesive film of the following composition and size.

The overall hook 1 consists of ABS.

The adhesive film 4 consists of a mixture of 50 parts of SIS TRIBLOCK polymer having a block polystyrene content of 29% by weight (VECTOR 4211, Dexco), 50 parts of a penta ester of partially hydrogenated rosin (PENTALYN H-E, Hercules) and 1 part of a phenolic anti-aging agent. This composition is extruded in a layer thickness of 600 $\mu$m onto double-sided siliconized release paper, and the laminate comprising adhesive composition and release paper is wound up into 50 mm wide stock rolls.

The adhesive film 4 is subsequently covered on both faces with a 30 $\mu$m thick siliconized polypropylene film.

In the next operation, strips 4 measuring 15 mm×15 mm are punched out by means of a lift punch.

In this context, the hook 1 is bonded with the adhesive film 4 in such a way that the entire strip 4 is masked by the baseplate 2.

The hook 1, now covered with the adhesive film 4, is applied to a dry, level and clean tile 6 by first peeling off the release film 41 which is on rear face of the adhesive film 4, and then pressing the hook 1 with the adhesive film 4 firmly against the tile 6 for five seconds.

In this case the hook 1 is firmly anchored and can now carry weights of up to half a kilogram.

In order to detach the hook 1, the baseplate 2 is taken firmly from both faces and is rotated clockwise in the plane of the bond. As a result, the adhesive film 4 separates from the tile 6 without leaving any residues or causing damage.

Separation can be effected alternatively by engaging a key having an appropriately shaped pin into the groove 21 in the baseplate 2 of the hook 1 which at the same time closely embraces two faces of the baseplate 2 in the manner of a generally known socket spanner. This key is able to transfer outstandingly the torque required to separate the hook 1.

Finally, the adhesive film 4 is removed from the baseplate 2 by peeling off the adhesive film 4 in the direction of the plane of the bond.

Subsequently the hook 1 can be bonded again without limitations.

I claim:

1. Redetachable, self-adhesive fixing device, comprising
   a) a baseplate,
   b) a strip of double-sided adhesive film having a front face and a rear face, said adhesive film being of a kind which, when adhesively attached to a substrate forms a bond without curing which can be broken by stretching said adhesive film, the front face of said film being attached to said baseplate, and being fully-covered by said baseplate to which it is attached, and wherein said device, when adhesively attached to a substrate by said rear face of said double-sided adhesive film, is detachable from said substrate without leaving any residues or causing damage by rotation of said baseplate essentially in the plane of said substrate.

2. Fixing device according to claim 1, wherein said baseplate has a thickness of less than 5 mm.

3. Fixing device according to claim 1, wherein said baseplate is provided with at least one groove.

4. Fixing device according to claim 1, wherein said strip has substantially the same shape as said baseplate.

5. Fixing device according to claim 1, wherein the adhesion of the adhesive film is less than the cohesion, the adhesion largely disappears when the film is extended, and the ratio of peel force to tear load is at least 1:1.5.

6. Fixing device according to claim 1, wherein said adhesive film comprises a thermoplastic rubber and tackifying resins, and said adhesive film has a high elasticity and a low plasticity.

7. Fixing device according to claim 1, wherein said rear face of said strip is covered with a release laminate before bonding to the substrate.

8. Fixing device according to claim 1, wherein said fixing device and said baseplate consist of plastic.

9. Fixing device according to claim 1, wherein said fixing device and said baseplate consist of metal.

10. Fixing device according to claim 1, wherein said baseplate is provided with at least one bore.

11. Fixing device according to claim 1, wherein said baseplate is provided with at least one groove and at least one bore.

\* \* \* \* \*